United States Patent
Svensson et al.

(10) Patent No.: US 9,102,355 B2
(45) Date of Patent: Aug. 11, 2015

(54) METHOD AND A SYSTEM FOR ASSISTING A DRIVER OF A VEHICLE DURING OPERATION

(75) Inventors: Jan-Inge Svensson, Göteborg (SE); Sten Ragnhult, Onsala (SE)

(73) Assignee: Volvo Lastvagnar AB, Göteborg (SE)

( * ) Notice: Subject to any disclaimer, the term of this patent is extended or adjusted under 35 U.S.C. 154(b) by 268 days.

(21) Appl. No.: 13/380,945

(22) PCT Filed: Jun. 29, 2009

(86) PCT No.: PCT/SE2009/000337
§ 371 (c)(1),
(2), (4) Date: Dec. 27, 2011

(87) PCT Pub. No.: WO2011/002346
PCT Pub. Date: Jan. 6, 2011

(65) Prior Publication Data
US 2012/0101687 A1 Apr. 26, 2012

(51) Int. Cl.
*B62D 15/02* (2006.01)
*B62D 5/04* (2006.01)
*B62D 6/00* (2006.01)

(52) U.S. Cl.
CPC ............ *B62D 15/025* (2013.01); *B62D 5/0472* (2013.01); *B62D 6/008* (2013.01); *B62D 15/024* (2013.01); *B62D 15/0215* (2013.01); *B62D 15/0245* (2013.01)

(58) Field of Classification Search
USPC .............. 701/42, 41; 180/421, 422, 443, 444
See application file for complete search history.

(56) References Cited

U.S. PATENT DOCUMENTS

| | | | | |
|---|---|---|---|---|
| 4,476,529 A | * | 10/1984 | Nakamura et al. | 701/41 |
| 4,588,198 A | * | 5/1986 | Kanazawa et al. | 280/90 |
| 5,699,874 A | * | 12/1997 | Miyaura | 180/443 |
| 6,102,151 A | * | 8/2000 | Shimizu et al. | 180/446 |

(Continued)

FOREIGN PATENT DOCUMENTS

| | | |
|---|---|---|
| EP | 1325858 A2 | 7/2003 |
| EP | 1421160 A1 | 6/2004 |

(Continued)

OTHER PUBLICATIONS

International Search Report for corresponding International Application PCT/SE2009/000337.

(Continued)

*Primary Examiner* — Nicholas Kiswanto
(74) *Attorney, Agent, or Firm* — WRB-IP LLP (57) ABSTRACT

A method is provided for assisting a driver of a vehicle during operation by providing the driver with a desired steering feel, wherein the vehicle includes a steering arrangement including a manually operated steering device, at least one pair of ground engaging members and a mechanical interconnection between the steering device and the ground engaging members. The method includes detecting a steering angle and determining a desired steering device guiding force based on the detected steering angle, providing the driver with the desired steering feel based on the desired steering device guiding force, and detecting the steering angle in a position at a ground engaging member side of an elastic steering force transmitting element in the steering arrangement.

23 Claims, 6 Drawing Sheets

(56) References Cited

U.S. PATENT DOCUMENTS

| | | | |
|---|---|---|---|
| 6,443,020 B1* | 9/2002 | Lin et al. | 73/862.334 |
| 6,527,079 B2* | 3/2003 | Takeuchi et al. | 180/443 |
| 6,741,053 B2* | 5/2004 | Kifuku et al. | 318/434 |
| 6,912,921 B2* | 7/2005 | Fujiwara et al. | 73/862.328 |
| 6,926,115 B2* | 8/2005 | Masaki et al. | 180/446 |
| 6,983,817 B2* | 1/2006 | Katou et al. | 180/446 |
| 7,084,593 B2* | 8/2006 | Crowley | 318/432 |
| 7,149,615 B2* | 12/2006 | Ura | 701/41 |
| 7,258,027 B2* | 8/2007 | Oike et al. | 73/862.331 |
| 7,410,028 B2* | 8/2008 | Chikaraishi | 180/402 |
| 7,454,986 B2* | 11/2008 | Kwasny et al. | 73/862.08 |
| 7,484,588 B2* | 2/2009 | Szabela et al. | 180/417 |
| 7,677,352 B2* | 3/2010 | Bohm | 180/444 |
| 7,681,463 B2* | 3/2010 | Watanabe et al. | 73/862.325 |
| 7,743,875 B2* | 6/2010 | Hidaka et al. | 180/446 |
| 7,793,755 B2* | 9/2010 | Ogasawara | 180/446 |
| 2002/0033300 A1* | 3/2002 | Takeuchi et al. | 180/446 |
| 2005/0016791 A1* | 1/2005 | Fukushima et al. | 180/446 |
| 2005/0236221 A1* | 10/2005 | Ura | 180/443 |
| 2005/0284688 A1* | 12/2005 | Deville | 180/443 |
| 2007/0095598 A1* | 5/2007 | Williams | 180/441 |
| 2008/0251307 A1* | 10/2008 | Bell | 180/170 |
| 2008/0262678 A1 | 10/2008 | Nishimura et al. | |

FOREIGN PATENT DOCUMENTS

| | | |
|---|---|---|
| EP | 1550839 A1 | 7/2005 |
| EP | 1982896 A2 | 10/2008 |
| FR | 2846412 A1 | 4/2004 |
| FR | 2848173 A1 | 6/2004 |
| JP | 2006273295 A | 10/2006 |
| JP | 2008162587 A | 7/2008 |
| WO | 2006067394 A1 | 6/2006 |

OTHER PUBLICATIONS

International Preliminary Report on Patentability for corresponding International Application PCT/SE2009/000337.
Supplementary European Search Report (Oct. 26, 2012) for Corresponding European App. EP 09 84 6893.
Japanese Official Action (Jun. 20, 2014) for corresponding Japanese App. 2012-518505.

* cited by examiner

METHOD AND A SYSTEM FOR ASSISTING A DRIVER OF A VEHICLE DURING OPERATION

BACKGROUND AND SUMMARY

The present invention relates to a method for assisting a driver of a vehicle during operation by providing the driver with a desired steering feel. The present invention is further directed to a system for assisting a driver of a vehicle during operation by providing the driver with a desired steering feel.

It is known to provide the driver with a desired steering feel by applying a guiding force to the steering device based on different input parameters, such as steering device deflection, lateral acceleration, yaw rate and vehicle speed.

The guiding force exerted onto the steering device is resistive if counteracting the force applied by the driver onto the steering device, or supportive if acting in the same direction as the force applied by the driver onto the steering device, thus for instance reducing the effect of e.g. frictional forces acting on the ground wheels and the like which are experienced by the driver as resistance when operating the steering device.

The steering device is normally formed by a conventional steering wheel in the case of a vehicle. However, the invention is applicable to other steering devices, such as a joystick, a sliding nipple or any other suitable steering device for steering the vehicle. For instance, in the case that the steering device is a steering wheel, the guiding force will appear as a guiding torque exerted onto the steering wheel. Thus, in this case, the term steering feel denotes the steering wheel torque experienced by the driver during operation of the vehicle.

EP 1431160 discloses a system for estimating a steering wheel resist torque based on steering wheel rotation angle, vehicle speed and lateral acceleration or yaw rate. The steering wheel is connected to the road wheels via a steering shaft arrangement and the delivered steering wheel resist torque is measured and compared with the estimated steering wheel resist torque, whereupon the delivered steering wheel resist torque is adapted by use of a feedback controller to be substantially the same as the estimated steering wheel resist torque. However, it has turned out that this system in certain operations does not provide the driver with an optimum steering feel.

It is desirable to achieve a method for assisting a driver which creates conditions for an improved steering feel.

A method according to an aspect of the present invention comprises the steps of detecting a steering angle and determining a desired steering device guiding force based on the detected steering angle and providing the driver with the desired steering feel based on the desired steering device guiding force characterized by the step of detecting the steering angle in a position at a ground engaging member side of an elastic steering force transmitting element in the steering arrangement. Thus, the steering angle is detected in a downstream position of the elastic steering force transmitting element in a direction from the steering device to the ground engaging members in the steering arrangement.

The term "elastic steering force transmitting element" refers to an element configured to allow a certain amount of twist about the steering axis (i.e. a circumferential displacement between an upper and a lower shaft of the steering arrangement), and may be formed by a torsion bar.

An accurate steering angle measurement is extremely important in order to provide the driver with an optimum and correct steering feel with regard to the vehicle behaviour. In other words, a less accurate input may result in that the driver is ,provided with an incorrect steering feel, which may be a safety risk in that it can lead to incorrect conclusions of the vehicle behaviour.

The invention is based on the insight that the steering angle value received from the steering wheel rotation angle sensor is not accurate enough for some operational conditions or driving scenarios. More specifically, the presence of the elastic steering force transmitting element (torsion bar) in the steering arrangement leads to an angular displacement between the actual steering angle at the ground wheels and the steering angle, which is detected at the steering wheel according to prior art. This problem is reinforced the less stiff the torsion bar is.

Especially, when a model representing certain desired steering characteristics associated to the vehicle behaviour and/or ground contact is used for determining the desired steering device guiding force, the steering wheel rotation angle has turned out to be too inaccurate for indicating the steering angle.

By the step of detecting the steering angle in a position at a ground engaging member side of the elastic steering force transmitting element in the steering arrangement, the angular displacement of the elastic steering force transmitting element and the therewith associated steering angle accuracy problems are eliminated.

The ground conditions differ for different applications and may vary with time. Especially, the frictional characteristics of the ground/road differ based on the road condition (asphalt, wet surface, ice, gravel surface, clay surface etc) and may be important for determining a correct desired steering device guiding force and delivering a corresponding correct steering feel to the driver. Further operational characteristics of the steering arrangement, such as internal friction, elasticity in the steering, variations of ground friction due to ground pressure, change of friction at initial slip, change of friction at full slip etc may also be important for determining a correct desired steering device guiding force and delivering a corresponding correct steering feel to the driver. Regarding slip, the parameters road wheel angle, yaw rate and vehicle speed are preferably detected and used as input values. Detecting the steering angle at the vicinity of the ground wheels, or at least below the steering force transmitting element in the steering arrangement, thereby creates conditions for an improved steering feel.

Preferably, the method comprises the step of applying the steering device guiding force to the steering arrangement by means of an actuator, such as an electric motor. Said elastic steering force transmitting element (torsion bar) is then arranged between the actuator and the steering device in the steering arrangement.

Preferably, the method comprises the steps of determining a current steering torque in the steering arrangement via said elastic steering force transmitting element and by providing the driver with the desired steering feel based also on the determined current torque in the steering arrangement. The determined current torque is indicative of the driver steering feel.

The steering torque can be determined based on the relative angular movement (twist) of the torsion bar and the stiffness of the torsion bar. According to an alternative, one or several strain gauges may be used.

Preferably, a delivered steering device guiding force is measured and compared with an estimated desired steering device guiding force, wherein the delivered steering device guiding force is adapted by use of a feedback controller to be substantially the same as the desired steering device guiding force through adapting the amount of said guiding force.

More specifically, the method creates conditions for determining a value of a final steering device guiding force to be applied to the steering device by subtracting a value of the determined current torque from a value of the determined desired steering device guiding force.

The wording "providing the driver with the desired steering feel" means that the steering device force delivered to and actually felt by the driver corresponds to or equals the desired steering device guiding force previously calculated. The term "steering feel" means in the case that the steering device is formed by a steering wheel that the driver experiences a desired steering wheel resist torque via the steering wheel.

According to a preferred embodiment, the method comprises the step of detecting the steering angle in the vicinity of one of said ground engaging members. This embodiment is especially advantageous when a model, representing certain desired steering characteristics associated to ground contact (such as tire friction). Preferably, the method comprises the step of detecting the steering angle by detecting a pivot angle of one of said ground engaging members. The pivot angle of one of said ground engaging members may be a king pin angle.

According to a further preferred embodiment, the method comprises the step of determining the current torque in the steering arrangement by detecting a relative angular movement of the elastic steering force transmitting element. Preferably, the method comprises the step of detecting a relative angular movement of the elastic steering force transmitting element by means of a first angular sensor arranged at an upper end of the elastic steering force transmitting element and a second angular sensor arranged at a lower end of the elastic steering force transmitting element. The term "upper end" indicates an end closer to the manually operated steering device than the opposite (lower) end of the element.

According to a further preferred embodiment, the method comprises the step of detecting the steering angle in the vicinity of the elastic steering force transmitting element. Preferably, the method comprises the step of detecting the steering angle by means of said second sensor used for determining the current torque in the steering arrangement. Using the same sensor for detecting the current steering torque and the steering angle is cost-efficient in that only one sensor is required for two different purposes.

Preferably, the desired steering device guiding force represents a nominal, desired steering feel.

The determined desired steering device guiding force can be based on further information, such as further desired steering characteristics in addition to the tire friction component. Thus, the determined desired steering device guiding force may be a sum of desired forces (such as torque components).

According to an example embodiment, the method comprises the step of providing the driver with the desired steering feel by applying a final steering device guiding force based on the desired steering device guiding force to the manually operated steering device.

The term "final" with regard to the steering device guiding force defines in this case that the actively supplied steering device guiding force does not necessarily equal the determined desired steering device guiding force. For example, the method comprises the step of determining an actual force to the steering device resulting from the vehicle steering arrangement during operation, and determining a value of a final steering device guiding force to be applied to the steering device by subtracting a value of the determined actual force from a value of the determined desired steering device guiding force.

Preferably, the actual force is formed by an actual torque to the steering wheel, which is determined via said elastic element, such as a torsion bar, in the steering arrangement.

Preferably, the method comprises the step of at least suppressing a driver steering feel from the influence of friction in the steering arrangement in the vehicle. The suppression of the driver steering feel from the influence of friction in the steering arrangement is preferably accomplished via a so-called reference generator function or any other known means of friction compensation device or function.

The suppression of the driver steering feel from the influence of friction in the steering arrangement is preferably accomplished simultaneously as the application of the steering device guiding force. Preferably a driver steering feel is decoupled from the influence of friction in the steering arrangement. Thus, the influence of friction in the steering arrangement is preferably completely removed.

The invention creates conditions for using an Electrical Power Assisted Steering (EPAS) system.

Especially, the method is applicable in steering systems where there is a mechanical connection between the steering device and the ground but where the inherent steering feel resulting from the mechanical connection during operation is eliminated or at least suppressed.

Preferably, the method comprises the step of applying the determined steering device guiding force to the steering arrangement and simultaneously at least suppressing steering device disturbances resulting from the mechanical interconnection.

Preferably, the method comprises the step of determining the steering device guiding force by means of at least one predetermined friction model of the desired friction in the vehicle steering arrangement. Preferably, the friction model represents the friction between the elastic steering force transmitting element and the steering device in the steering arrangement. This embodiment is based on the insight that this specifically defined friction is advantageous for the steering feel.

It is also desirable to achieve a system for assisting a driver which creates conditions for an improved steering feel.

A system for assisting a driver of a vehicle during operation by providing the driver with a desired steering feel according to another aspect of the present invention is provided, wherein the vehicle comprises a steering arrangement comprising a manually operated steering device, at least one pair of ground engaging members and a mechanical interconnection between the steering device and said ground engaging members, wherein the system comprises means for detecting a steering angle, means for determining a desired steering device guiding force based on the detected steering angle and means for providing the driver with the desired steering feel based on the desired steering device guiding force characterized by that said steering angle detection means is arranged for detecting the steering angle in a position at a ground engaging member side of an elastic steering force transmitting element in the steering arrangement.

Further example embodiments and advantages thereof emerge from the description below, the figures and the claims.

BRIEF DESCRIPTION OF FIGURES

The invention will be described in greater detail below with reference to the embodiment shown in the accompanying drawings, in which FIG. 1 schematically shows a system for performing the inventive method according to one embodiment, FIG. 2-3 shows an embodiment for a friction model, FIG. 4a schematically shows an example of a steering arrangement and a control function in the system of FIG. 1, FIG. 4b schematically shows an alternative arrangement of the electric motor in FIG. 4a, FIG. 5 schematically shows an example of an electric motor in a perspective view for use in the inventive system.

DETAILED DESCRIPTION OF PREFERRED EMBODIMENTS

Figure 1:
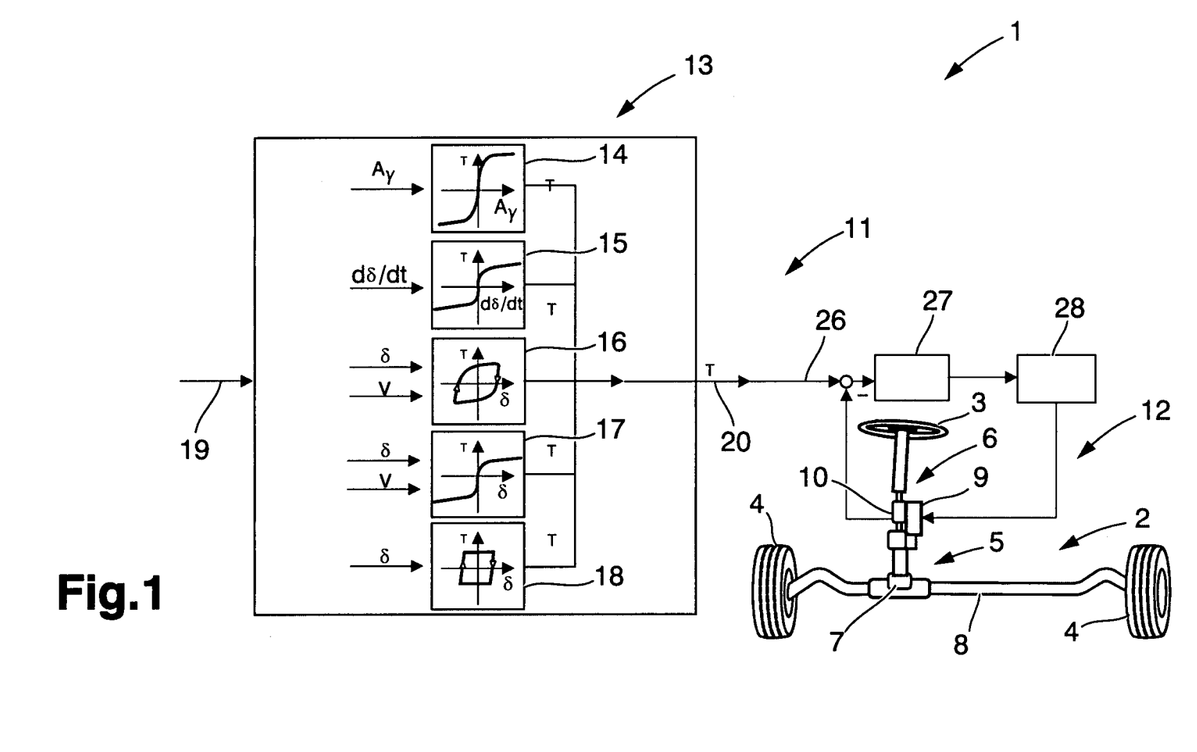

The invention is below described for application in a truck. However, the invention should not be regarded as limited to trucks, but it may be applied also in other vehicles, such as cars. FIG. 1 schematically shows a system 1 for performing a control method according to one embodiment. The system 1 comprises a mechanical steering arrangement 2, which may be of a conventional type, see also FIGS. 4a, 6 and 7a. The mechanical steering arrangement 2 comprises a steering device 3 in the form of a steering wheel, at least one ground engagement member 4 in the form of a ground wheel and a mechanical connection 5 between the steering wheel 3 and the ground wheels 4 for mechanical transmission of steering signals from the steering wheel 3 to the ground wheels 4.

The steering wheel 3 is arranged in a vehicle passenger compartment (see also FIGS. 6 and 7a) and manually operated by the driver of the vehicle to steer the ground wheels 4. The steering arrangement 2 comprises a steering linkage means 6 extending from the steering wheel 3 down to a steering gear (Hydraulic Power Assisted System (HPAS)) 7 for converting angular rotation in the steering linkage 6 to a linear movement via a steering member 8. The HPAS may be of conventional type comprising a hydraulic cylinder (not shown), a torsion bar 43 and a transmission 44, see FIG. 4a. The steering member 8 is coupled on opposite ends to a left and right ground wheel 4 and configured to turn the ground wheels 4 in response to steering signals from the steering wheel 3.

The system 1 further comprises an actuator 9 to provide supported adjustment of the steering angle. The actuator is positioned above (and with regard to the steering force from the steering wheel upstream of) the steering gear 7. The actuator 9 is preferably formed by an electric motor. The actuator 9 provides a guiding force, and more specifically a guiding torque, or assist torque, to the steering assembly for assisting the driver in steering the steering wheel. Thus, the electric motor forms a means for providing the driver with the desired steering feel. The electric motor 9 may be arranged around a steering column in the steering arrangement 2, wherein the magnetic field acts directly on the steering column, see FIGS. 4a and 5.

Figure 5:
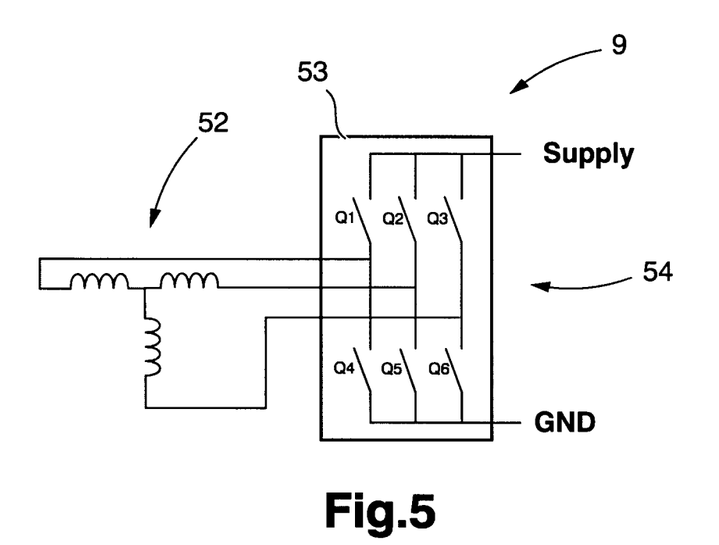

An example of a known electric motor 9 for application in the system is shown in FIG. 5. The electric motor 9 is of the type which requires that a control unit 45 receives information about the rotor position in order to control the commutation (for example a three phase synchronous motor). An Output signal from a steering angle sensor 42 is used for monitoring the rotor position for controlling said commutation. The electric motor further comprises armature windings 52. Further, a commutator 53 with a three phase bridge 54 arranged between a supply and an electrical ground (GND) is shown.

Figure 4A:
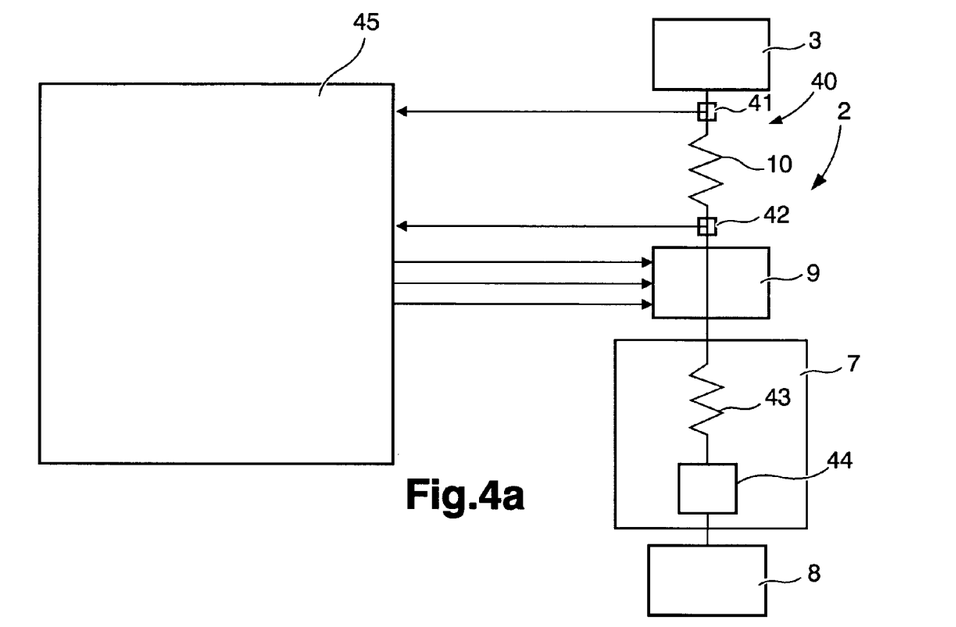

The system 1 further comprises a torque-measuring device 40 for measuring a manual torque applied by the driver to the steering wheel, see FIG. 4a. The torque-measuring device 40 comprises an elastic steering force transmitting element 10, which preferably constitutes a torsion bar, and two rotation angle sensors 41,42. In other words, a steering angle is measured via the torsion bar 10. In other words, the sensors 41,42 detect, as the steering torque applied to the steering wheel, a relative displacement in a circumferential direction which is generated between the upper and lower shafts with twist of the torsion bar 10 interposed between the upper and lower shafts. Thus, said device 40 forms a means for determining a current steering torque in the steering arrangement via said elastic steering force transmitting element 10.

The system 1 further comprises an Electrical Power Assisted Steering (EPAS) system 11. The EPAS 11 comprises a regulating loop 12 (feedback controller), which is configured to achieve a torque-free steering. The regulating loop 12 is configured to receive an input signal indicative of a current steering torque in the steering wheel 3. The input signal is received from the torque-measuring device 40. Basically, the regulating loop 12 is configured to output a signal to the actuator 9 so that said torque free steering is achieved.

The regulating loop 12 comprises a controller, or regulator, 27 which comprises a filter function. The filter function may be based on an inverse model of the steering dynamics of the present vehicle. Further, the regulator 27 may be configured to reduce errors in the model and to reduce disturbances and measurement noise in order to reduce the risk of instability in the system.

The regulator 27 is configured to receive a signal indicative of a torque to be applied to the steering arrangement via the electric motor and in response thereto produce an output signal. The regulating loop 12 further comprises an electric motor control means 28, which is configured to receive the output signal indicative of a torque from the regulator 27 and produce a signal with a corresponding current value to the electric motor. According to an alternative, the regulator 27 and the electric motor control means 28 are combined in a single controller.

The EPAS further comprises a controlling function 13, below referred to as a reference generator, which is configured to determine a desired torque to be applied to the steering wheel in order to provide the driver with a desired steering feel. In other words, the reference generator describes a nominal vehicle. The reference generator forms a means for determining a desired steering device guiding force based on a detected steering angle.

Further, the reference generator 13 is operatively connected to the regulating loop 12 and outputs a signal indicative of a desired steering torque. The signal indicative of a desired steering torque. The regulating loop is configured to compare the desired steering torque to the actual, current steering torque and continuously adapt the output signal to the actuator so that the desired steering torque is transmitted to the driver. In other words, the actuator is controlled so that it applies the difference in torque between the desired torque value from the reference generator and the current actual torque in the steering assembly so that the actual torque is controlled to substantially equal the desired torque.

FIG. 4a schematically shows the control unit 45, which represents the reference generator 13 and the controllers 27,28 in FIG. 1. The control unit 45 is configured to receive signals from the rotational angle sensors 41,42. The control unit 45 is further configured to control the electric motor 9. In FIG. 4a, the electric motor 9 is arranged to act directly on a steering column in the steering arrangement 2. More specifically, a rotor in the electric motor 9 forms a part of the steering column.

Figure 4B:
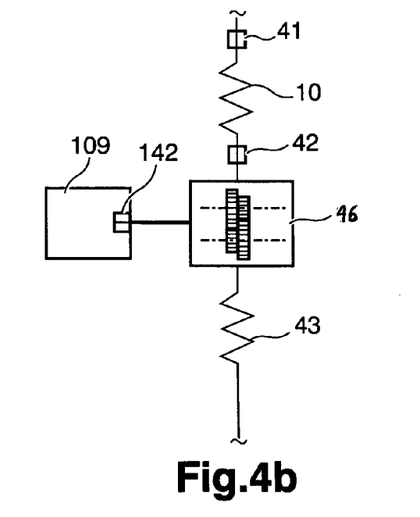

FIG. 4b schematically shows an alternative to the embodiment shown in FIG. 4a. A transmission 46 is arranged between the steering column and the electric motor 109. The transmission 46 is only schematically shown and preferably comprises a set of pinion gears. The transmission 46 is preferably configured to change up the rotational speed from the steering column to the electric motor. The electric motor is in this case preferably constituted by a high speed motor. The steering angle sensor 142 is arranged in the electric motor 109. This alternative is especially advantageous since the resolution of the steering angle value is improved. Thus, the steering angle sensor 142 is positioned upstream of the change up gears in the transmission 46 in a direction from the electric motor 109. According to an alternative to the embodiment shown in FIG. 4b, the steering angle sensor 142 may be arranged between the transmission 46 and the electric motor 109 or even within the transmission, preferably at an output shaft of the transmission.

The reference generator 13 comprises at least one steering device guiding force operation model and in the example in FIG. 1 a plurality of guiding force operation models 14,15, 16,17,18. The guiding force operation model preferably comprises a mathematical model. The model (s) is designed in a way to achieve a desired steering feel in the steering device. Thus, the model (s) can be designed in different ways for different vehicle types and/or for different desired steering feels.

Further, the model (s) comprises at least one desired steering characteristic parameter. More specifically, each model is configured to produce a guiding torque value T for one desired and predetermined steering characteristic parameter based on at least one input 19. In other words, the steering characteristic parameter is a guiding force influencing operational parameter. Each model comprises a mathematical function, wherein the torque value is determined as a function of a value of the input, see illustrated examples of the functions in FIG. 1.

The individual torque values resulting from the models are summed up to a torque sum, which forms an output 20 from the reference generator. According, to the shown embodiment, the reference generator comprises models for the following steering characteristic parameters: vehicle lateral acceleration, damping of steering device movements, tire friction, self alignment of the steering device to a neutral position and friction in the mechanical connection between the steering device and the ground wheels.

The signals input to the reference generator comprises at least one signal indicative of a steering intent of the driver, such as a steering angle (δ) and a rate of change of the steering angle (dδ/dt). The steering angle is detected in a position at a ground engaging member side of the elastic steering force transmitting element 10 in the steering arrangement, such as by-measuring a road wheel angle or anywhere inbetween the elastic steering force transmitting element and the road wheel in the mechanical steering arrangement, for at least one of said models (which is adapted to represent a vehicle behaviour). This signal indicative of a steering intent may be an electric motor angle or a ground wheel angle. Similarly, the signal indicative of a steering intent may be a rate of change of the electric motor angle or a rate of change of the ground wheel angle.

Especially, using a steering angle value detected in a position at a ground engaging member side of the elastic steering force transmitting element 10 in the steering arrangement is advantageous for each model representing a steering characteristic associated to the vehicle behaviour and/or ground contact. Examples of such models are: the tire friction model 16, the self alignment model 17 and possibly the lateral acceleration model 14.

On the other hand, using a steering angle value detected in a position at the steering wheel (and a rate of change of the steering wheel rotation angle) is advantageous for each model representing a steering characteristic associated to the steering arrangement/steering column. Examples of such models are: the steering arrangement friction model 18 and the damping model 15.

The signals input to the reference generator comprises at least one signal indicative of a vehicle body motion, such as lateral acceleration (Ay) and/or yaw rate. Such a vehicle body motion may be sensed by a sensor arranged in the vehicle.

The vehicle lateral acceleration model 14 represents a predetermined relationship between a guiding torque value and the current lateral acceleration for achieving a desired steering feel. Thus, the model 14 receives a signal indicative of a current lateral acceleration as an input signal. According to the example function shown in FIG. 1, the torque value increases dramatically for small input values of the lateral acceleration. Further, the torque value increases substantially less for larger input values of the lateral acceleration. In other words, the curve flattens out. The vehicle lateral acceleration model 14 is preferably a pure statical mapping. According to a preferred example, the vehicle lateral acceleration is the most important steering characteristic parameter.

The damping model 15 represents a predetermined relationship between a guiding torque value and the current steering speed for achieving a desired steering feel. Thus, the damping model 15 preferably receives a signal indicative of a steering speed (for example rate of change of the steering column position). According to the example function shown in FIG. 1, the torque value increases dramatically for small input values of the steering speed. Further, the torque value increases substantially less for larger input values of the steering speed. In other words, the curve flattens out. The damping model 15 is preferably a pure statical mapping. The torque value output from the damping model is configured to act in an opposite direction with regard to the current steering speed. The damping model is preferably designed so that the resulting torque is smaller for higher steering speeds and higher for smaller steering speeds. In this way, the damping torque is proportional to the steering speed during normal driving and limited to a maximum value during parking or evasive manouevres.

Thus, the vehicle lateral acceleration model 14 and the damping model 15 are linked to each other.

The self alignment model 17 represents a predetermined relationship between a guiding torque value and the current steering wheel angle for achieving a desired steering feel. By self alignment of the steering device to a neutral position is meant an active return, i.e. the return of the released steering wheel to a central setting. The self alignment model 17 preferably receives a signal indicative of the steering wheel angle and a signal indicative of vehicle speed as input signals. The purpose of the vehicle speed input signal is to be able to modulate the desired aligning torque with the current vehicle speed in a way that the self alignment torque can be reduced during high speed driving.

Regarding the friction models 16,18; a certain amount of friction feel in the steering wheel is desired. For example, Coulomb friction is desired during on-centre handling in order to achieve a desired torque build-up for small steering wheel angle deviations. Further, Coulomb friction is as well desired while driving long curves, so that the steering forces are reduced, wherein the driver can "rest" the steering wheel on the friction.

The tire model 16 comprises a hysteresis curve, which represents a tire model. Preferably, the model 16 is a dynamic model of an unrolling tire with regard to steering torque The relation between the steering angle and the torque is given by a physical relationship, where the deflection of individual rubber elements is modeled dependent on the differential angle of the steering wheel and the torsion and relaxation of the rubber elements due to the rolling tire. The resulting model yields thus a smaller hysteresis effect with increasing vehicle speed and constant steering angle frequency.

The inventive method creates conditions for canceling the actual friction effect in the steering wheel resulting from the actual steering arrangement and instead applying a desired resistance torque to the steering wheel, which represents a nominal friction feel for the driver. Thus, the hardware (mechanical steering arrangement) is decoupled from the friction steering feel. In other words, the invention creates conditions an application-independent (hardware-independent) friction steering feel.

The tire friction model 16 and the mechanical connection friction model 18 are in principle similar to each other. The tire friction model 16 represents the friction between the tire and the ground while the mechanical connection friction model 18 represents the friction in the upper steering wheel steering column assembly. Thus, a lumped frictional stiffness in the mechanical connection friction model 18 is higher than in the tire friction model 16. The tire friction model

16 preferably receives a signal indicative of a steering angle and a signal indicative of vehicle speed. The mechanical connection friction model 18 preferably receives a signal indicative of a steering angle.

Figure 2:
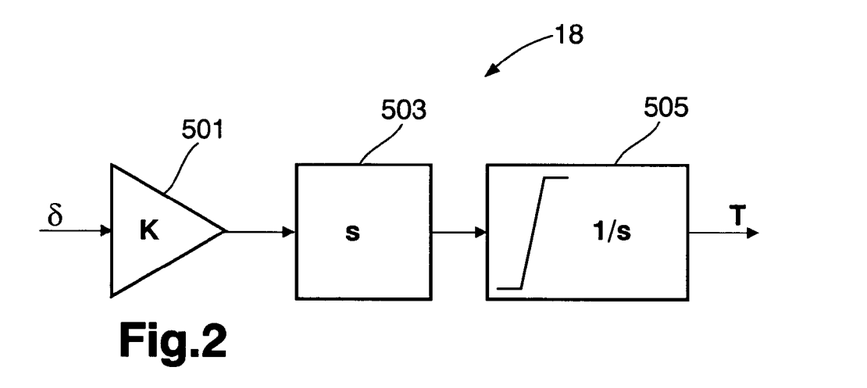
Figure 3:
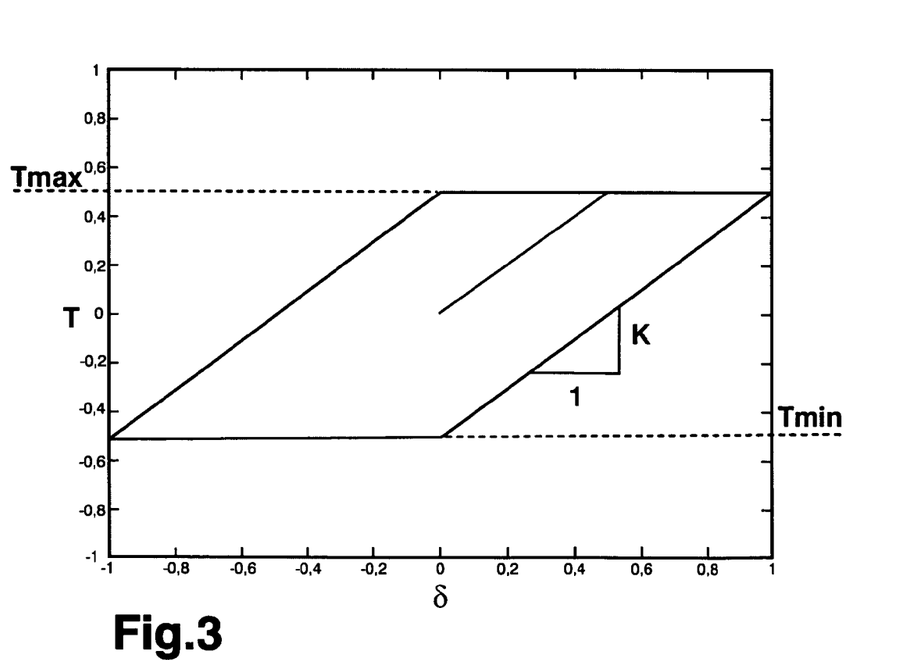
Figure 6:
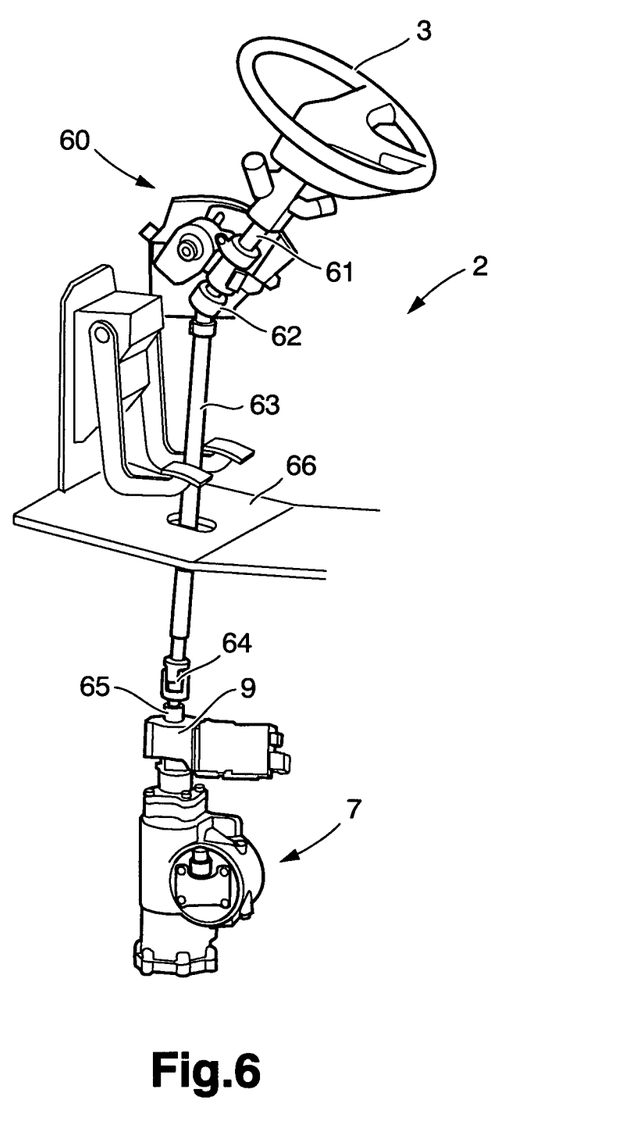
FIG. 6 shows a detailed example of a steering arrangement according to the invention.

FIGS. 2-3 show in more detail an example of the friction model 16,18. The value of the steering angle δ is input to a first box 501 representing a stiffness K, which corresponds to a lumped spring stiffness in Nm/Rad. The resulting value from the first box 501 is input to a second box 503 representing a derivative as indicated by the Laplace operator s. The derived steering angle signal, i.e. the steering angle speed multiplied with the stiffness K is passed into a third box 505 representing an integrating function with anti windup functionality, indicated through the integrational limits and the inverse of the laplace transformator. The limit values are chosen in order to limit the frictional torque to the desired maximum and minimum values. The mentioned anti-windup functionality is intended to cease integration once the integrational limits are reached. The relationship between the steering angle δ and the output torque value is shown in FIG. 6.

The steering characteristic model (s) 14,15,16,17,18 is preferably designed so that a different steering characteristic parameter takes precedence over the others in different driving scenarios. According to one example, the lateral acceleration is configured to take precedence over the other steering characteristic parameters during driving in high speed. According to a further example, steering system friction and tire friction are configured to take precedence over the other steering characteristic parameters during driving in low speed. The damping torque is equally active regardless of vehicle speed. According to a further example, the self alignment is configured to take precedence over the other steering characteristic parameters during driving in an intermediate speed interval between the high speed and the low speed.

The present invention concerns a method for assisting the driver of the vehicle during operation. According to a preferred embodiment, the control method is configured to allow a control of the steering characteristics experienced by a driver of the vehicle during traveling. In other words, the control method is configured to provide the operator with a steering feel (or steering sensitivity or tactile feedback) through the steering wheel.

With regard to friction feel, according to an example embodiment, the method comprises the step of determining the desired resistance torque based on an input representing a steering angle. By determining a direction of the actual steering angle (clockwise or counterclockwise) and instantly applying, a torque—in the same direction, the effect of the friction in the steering arrangement can be effectively cancelled.

FIG. 6 shows the steering arrangement 2 in more detail. A steering wheel adjustment device 60 is arranged just below the steering wheel 3, which allows the driver to adjust the position of the steering wheel. The steering arrangement 2 comprises a first joint 62, which operatively connects an upper steering shaft 61 with an intermediate steering shaft 63 and a second joint 64, which operatively connects the intermediate steering shaft 63 with a lower steering shaft 65. The actuator (electric motor) 9 is positioned operatively between the steering gear 7 and the steering wheel 3. More specifically, the electric motor 9 is positioned between the lower, second joint 64 and the steering gear 7. By detecting the steering angle in (or at) the electric motor (or at least downstream of the lower second joint 64), any angular displacement errors in the joints 62,64 are eliminated. The steering arrangement 2 (the intermediate steering shaft 63) runs through a hole in a floor 66 in the operator compartment.

Figure 7A:
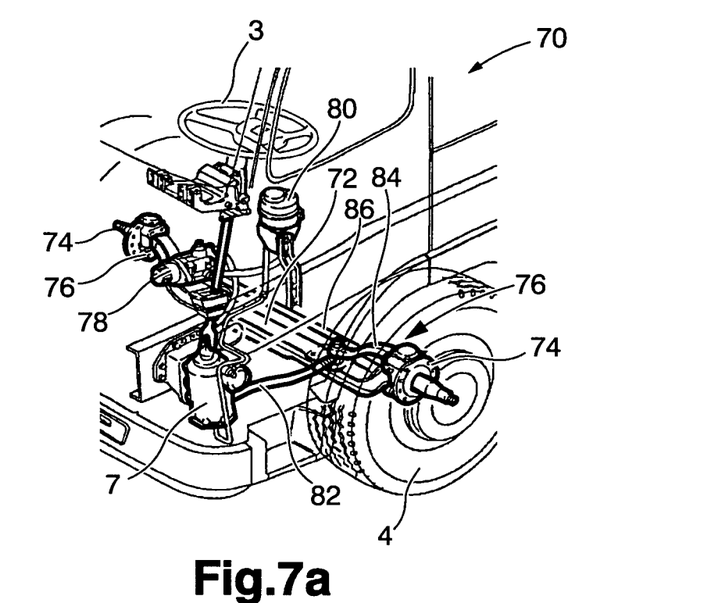
FIG. 7a shows a partly cut, perspective view of a front section of a truck, comprising the steering arrangement of FIG. 6.

FIG. 7a shows a partly cut, perspective view of a front section of a truck 70, comprising the steering arrangement 2 of FIG. 6. The front ground wheels 4 are suspended on a rigid front axle 72 and steering knuckles 74. The steering knuckles 74 are flexibly attached to the front axle by pivot means 76 in the form of kingpins, which are journalled at both ends. The steering arrangement 2 comprises a servo pump 78, which is operatively connected to the steering gear 7 for transmitting hydraulic fluid under pressure to the steering gear 7. Further, the servo pump 78 is operatively connected to a hydraulic reservoir 80.

When the driver turns the steering wheel 3 its movements is transmitted via the steering shafts 61,63,65 to the steering gear 7. When the steering wheel movement reaches the steering gear it is reinforced by hydraulic pressure from the servo pump 78. A drop arm (not shown) then transmits the steering movement from the steering gear 7 via a drag link 82 to a steering arm 84 and further to the steering knuckle 74, wherein the ground wheel 4 turns. A further steering arm (track rod) 86 connects the steering knuckles 74 at each ground wheel in order to ensure that the other ground wheel turns too.

Figure 7B:
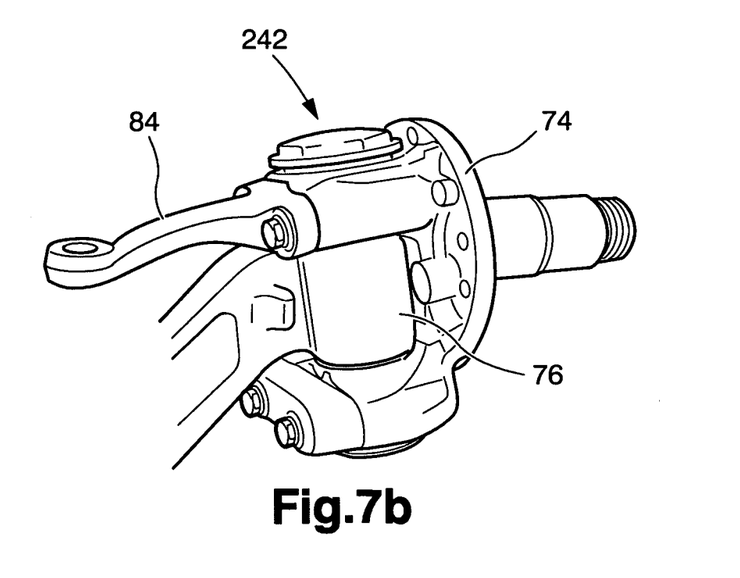
FIG. 7b shows an enlarged view of an arrangement at a steering knuckle in FIG. 6.

FIG. 7b shows an enlarged view of the arrangement at the steering knuckle 74 in FIG. 7a. The steering angle is detected by detecting a pivot angle of one of said road wheels 4. More specifically, the king pin angle of one of said wheels 4 is detected via a dedicated sensor 242.

The reference generator 13 and the regulating loop 12 (comprising the controllers 27,28) are preferably implemented in software.

A value of the vehicle lateral acceleration may be estimated from a measured vehicle yaw rate.

The invention claimed is:

1. A method for assisting a driver of a vehicle during operation by providing the driver with a desired steering feel, wherein the vehicle comprises a steering arrangement comprising a manually operated steering device, at least one pair of ground engaging members and a mechanical interconnection between the steering device and the ground engaging members, comprising
detecting a steering angle in a position at a ground engaging member side of an elastic steering force transmitting element in the steering arrangement,
determining a desired steering device guiding force based on the detected, steering angle,
determining a current steering torque in the steering arrangement via the elastic steering force transmitting element,
determining the desired guiding force by means of at least one steering device guiding force operational model using the detected steering angle as an input, and
providing the driver with the desired steering feel based on a difference between the determined desired steering device guiding force and the determined current torque in the steering arrangement,
further comprising determining the current torque in the steering arrangement by detecting a relative angular movement of the elastic steering force transmitting element:
and further comprising detecting a relative angular movement of the elastic steering force transmitting element by means of a first angular sensor arranged at an upper end of the elastic steering force transmitting element and a second angular sensor arranged at a lower end of the elastic steering force transmitting element.

2. A method according to claim 1, comprising detecting the steering angle in the vicinity of one of the ground engaging members.

3. A method according to claim 1, comprising detecting the steering angle by detecting a pivot angle of one of the ground engaging members.

4. A method according to claim 1, comprising detecting the steering angle in the vicinity of the elastic steering force transmitting element.

5. A method according to claim 1 comprising detecting the steering angle by means of the second sensor used for determining the current torque in the steering arrangement.

6. A method according to claim 1, comprising providing the driver with the desired steering feel via an actuator operatively connected to the steering arrangement, wherein the actuator is operatively positioned between the elastic steering force transmitting element and the ground engaging members.

7. A method according to claim 6 wherein the actuator is formed b an electric motor.

8. A method according to claim 6 comprising detecting the steering angle in the actuator.

9. A method according to claim 1, wherein the elastic steering force transmitting element forms a torsion bar.

10. A method according to claim 1, wherein the at least one guiding force operation model comprises at least one desired steering characteristic parameter, which is indicative of a vehicle behaviour.

11. A method according to claim 10, wherein the at least one desired steering characteristic parameter comprises tire friction.

12. A system for assisting a driver of a vehicle during operation by providing the driver with a desired steering feel, wherein the vehicle comprises a steering arrangement comprising a manually operated steering device, at least one pair of ground engaging members and a mechanical interconnection between the steering device and the ground engaging members, wherein the system comprises
means for detecting a steering angle,
means for determining a desired steering device guiding force based on the detected steering angle,
means for determining a current steering torque in the steering arrangement via an elastic steering force transmitting element in the steering arrangement, and
means for providing the driver with the desired steering feel based on the desired steering device guiding force,
wherein the means for detecting the steering angle is arranged for detecting the steering angle in a position at a ground engaging member side of the elastic steering force transmitting element,
wherein the means for determining the desired guiding force comprises at least one steering device guiding force operation model using said detected steering angle as an input, and the means for providing the driver with the desired steering feel is configured to provide the desired steering feel based on a difference between the determined desired steering device guiding force and the determined current torque in the steering arrangement,
wherein the means for determining the current torque in the steering arrangement is configured to detect a relative angular movement of the elastic steering force transmitting element,
wherein the means for determining the current torque that is configured to detect a relative angular movement of the elastic steering force transmitting element comprises a first angular sensor arranged at an upper end of the elastic steering force transmitting element and a second angular sensor arranged at a lower end of the elastic steering force transmitting element.

13. A system according to claim 12, wherein the means for detecting the steering angle is arranged for detecting the steering angle in the vicinity of one of the ground engaging members.

14. A system according to claim 12, wherein the means for detecting the steering angle is arranged for detecting a pivot angle of one of the ground engaging members.

15. A system according to claim 12, wherein the means for detecting the steering angle is arranged to detect the steering angle in the vicinity of the elastic steering force transmitting element.

16. A system according to claim 12 wherein the means for detecting the steering angle comprises the second sensor used for determining the current torque in the steering arrangement.

17. A system according to claim 12, wherein the means for providing the driver with the desired steering feel comprises an actuator operatively connected to the steering arrangement, wherein the actuator is positioned between the elastic steering force transmitting element and the ground engaging members.

18. A system according to claim 17 wherein the actuator is formed by an electric motor.

19. A system according to claim 17 wherein a sensor is arranged for detecting the steering angle in the actuator.

20. A system according to claim 12, wherein the elastic steering force transmitting element forms a torsion bar.

21. A system according to claim 12, wherein the at least one guiding force operation model comprises at least one desired steering characteristic parameter, which is indicative of a vehicle behaviour.

22. A system according to claim 21, wherein the at least one desired steering characteristic parameter comprises at least tire friction.

23. A vehicle comprising a system according to claim 12.

* * * * *